Sept. 1, 1931. H. P. WRIGHT 1,821,048
FERTILIZER DISK MIXER
Filed Aug. 28, 1929 3 Sheets-Sheet 2
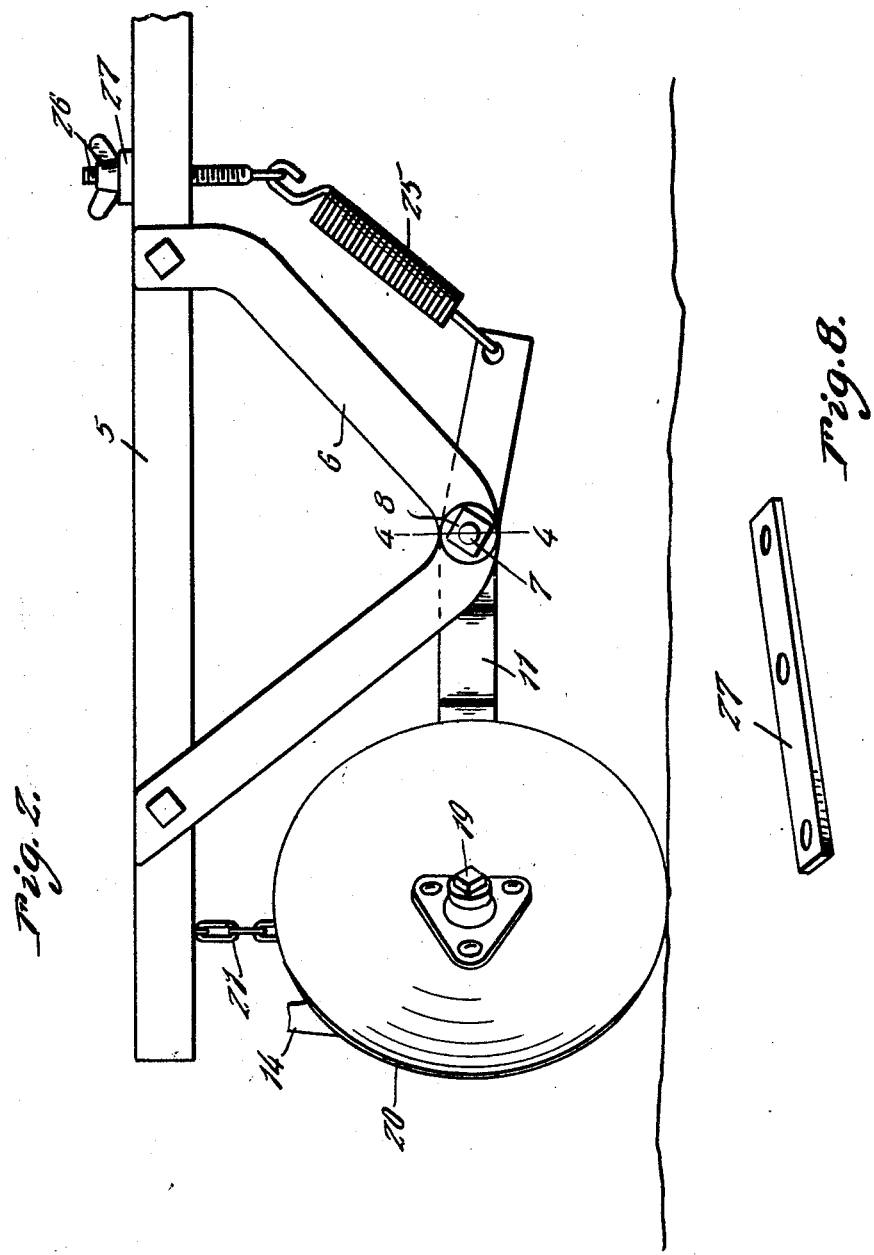
Inventor
Harry P. Wright
By Clarence A. O'Brien
Attorney

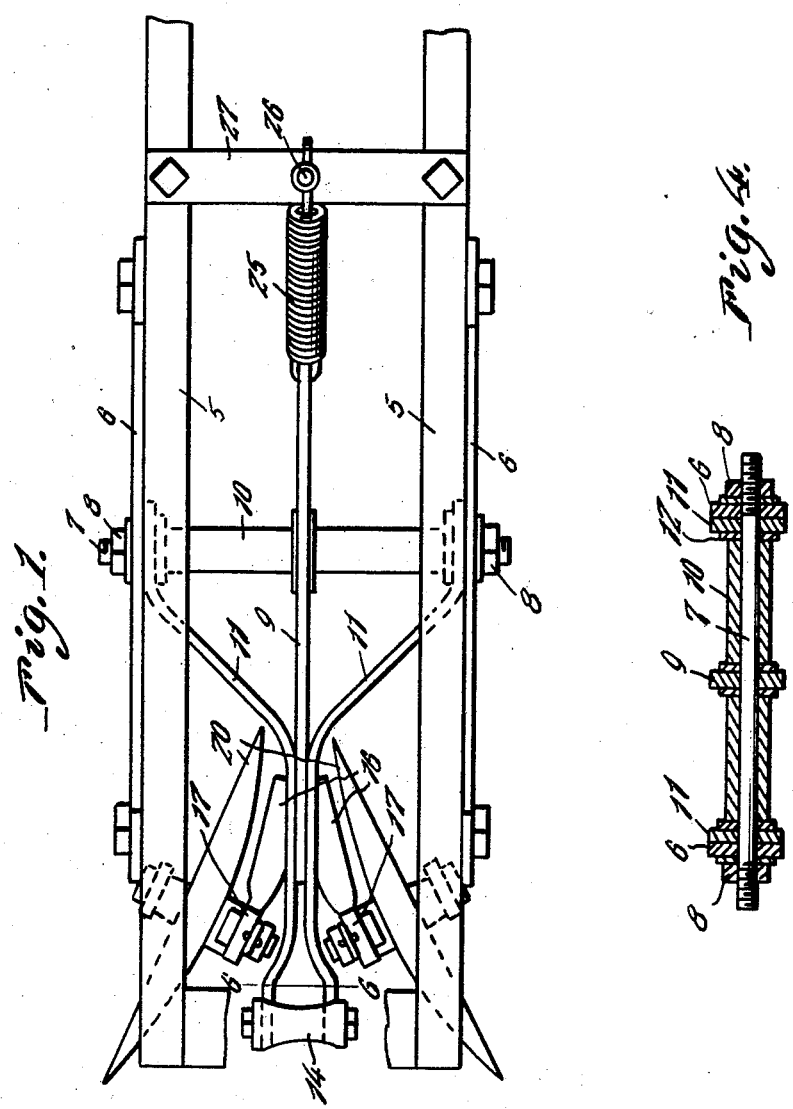

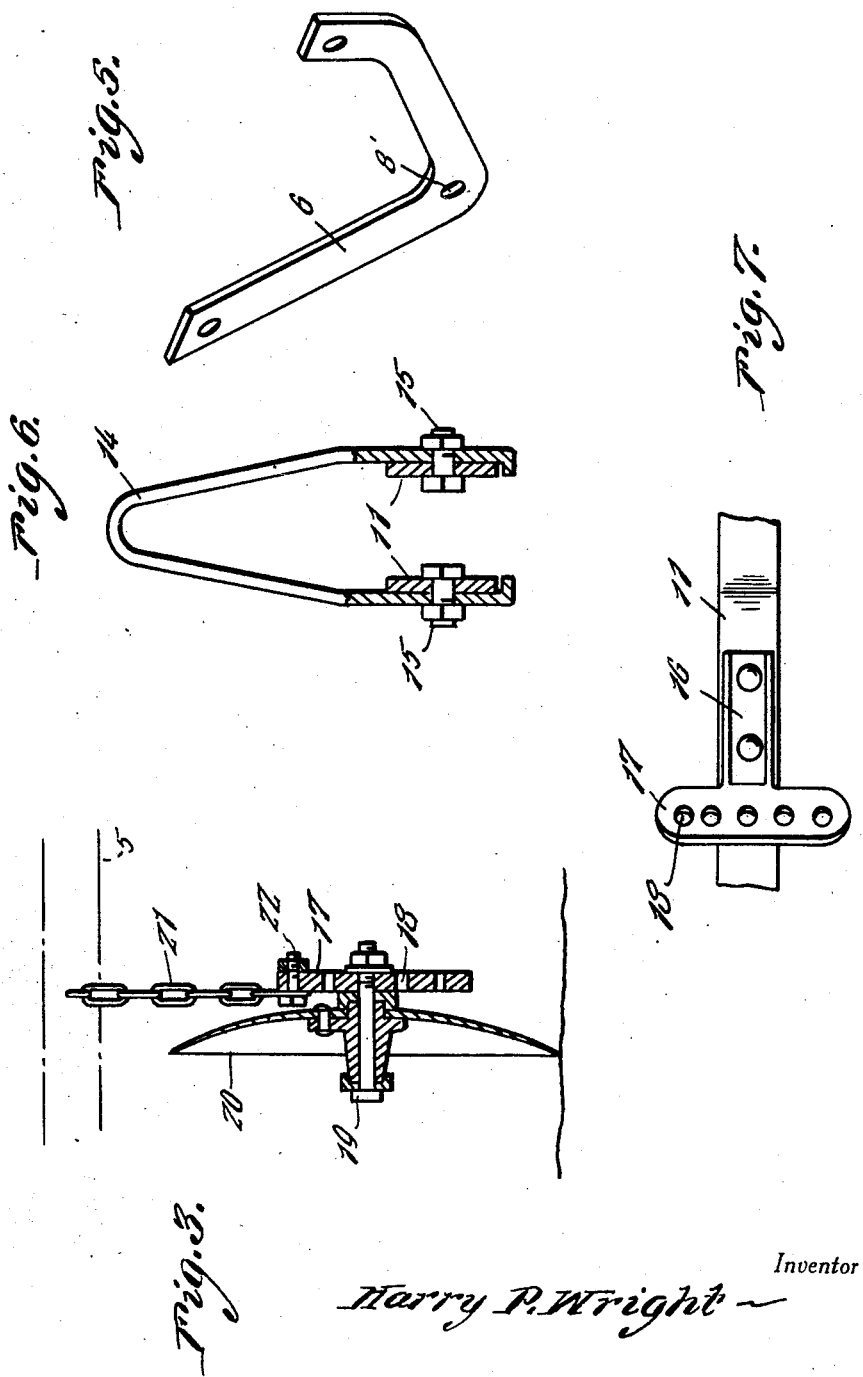

Patented Sept. 1, 1931

1,821,048

UNITED STATES PATENT OFFICE

HARRY P. WRIGHT, OF CARIBOU, MAINE, ASSIGNOR OF ONE-HALF TO MAURICE DANIELS, OF CARIBOU, MAINE

FERTILIZER DISK MIXER

Application filed August 28, 1929. Serial No. 389,008.

The present invention relates to an improvement on the common type of fertilizer disk mixer now in use particularly for potato planters.

The type now in common use has the disks so arranged that they are pushed along the ground. This type causes a lot of trouble in breakage because whenever an obstacle, a rock for instance is met, the disks frequently and easily break or if they do not break, they frequently come out of line and cause what is commonly known as "pairing the rows". That is, when planting with disks out of line, the planter plants two rows very close to each other and the next two would be far apart and so on.

The prime object of the present invention is to do away with these imperfections.

Another very important object of the invention resides in the provision of a mechanism of this nature which is exceedingly simple in construction, inexpensive to manufacture, strong and durable, thoroughly efficient and reliable in use, and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the mechanism embodying the features of my invention, Figure 2 is a side elevation thereof, Figure 3 is a vertical section through one of the disks, Figure 4 is a sectional view through the fulcrum bolt and associated parts, Figure 5 is a perspective view of one of the hanger bars, Figure 6 is a sectional view taken substantially on the line 6—6 of Figure 1.

Figure 7 is an enlarged detail elevation showing one of the brackets, and

Figure 8 is a perspective view of the cross bar.

Referring to the drawings in detail numerals 5 indicate the usual bars which are attached to the pole (not shown) and hold the attachment to the planter (not shown). Substantially V-shaped hanger bars 6 are bolted or otherwise secured to the bars 5 and have a rod 7 extending through openings 8' in the apexes thereof.

This rod is secured in place by means of nuts 8. A rocker or lever 9 is rockably mounted intermediate its ends on the center of the rod 7 and held in the center by means of spacers 10. Bars 11 have openings through which the rod 7 extends at their forward ends, said forward ends being located between the bars 6 and washers 12 at the outer end of the spacers 10 and then these bars 11 converge inwardly and rearwardly toward each other being secured to the rear end of the lever 9 and extending rearwardly and to their rear ends is attached an inverted U-shaped member 14 which extends upwardly and is preferably bolted thereto as at 15.

The portions of the bars 11 extending alongside the rear end of the lever 9 have rearwardly diverging brackets 16 secured thereto the rear ends of which terminate in vertically disposed cross plates 17 with a plurality of openings 18 formed therein so that axle bolts 19 may be disposed in any of the openings 18 for supporting disks 20 at the desired height.

Chains 21 are connected with the upper ends of the plates 17 by means of bolts 22 extending through the upper openings 18 and these chains are secured to the rear end portions of the bars 5 in any suitable manner to limit the downward movement of the disks 20.

Disks 20 are normally held downwardly as far as allowable by the chains 21 by providing a spring 25 which is anchored on the forward end of the lever 20 and adjustably anchored as at 26 by means of the bolt and thumb nut to the center of a cross bar 27 extending between the forward portions of the bar 5.

Obviously by tightening up on the thumb nut the tension of the spring may be increased and the increasing of the tension of the spring in turn increases the depth at which the disk will cut in the ground while loosening the nut decreases the tension of the spring and decreases the depth in which the disk will cut. By this arrangement the farmer can plant at any depth desired.

With this type of mixer it will be noted that the disks converge forwardly toward each other and are therefore pulled along the ground and have associated therewith the tension spring so that when a rock is reached the spring gives and the disks are rolled up over the obstruction.

It will be further seen that with my improved structure an apparatus is provided which is sturdy and has its parts arranged in an exceedingly compact and convenient manner.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In an apparatus of the class described, a frame, hangers depending from the frame, a rod mounted across the lower portions of the hangers, a pair of bars rockable on the rod at the ends thereof and converging rearwardly toward each other, a pair of disks, means on the outer side of each bar for mounting a disk so that they converge forwardly toward each other, a lever connected at one end to the said rockable bars and fulcrumed at its intermediate portion on the center of the rod and spring means connected with the other end of the said lever to normally urge the disks downwardly, means for tensioning the spring, and an inverted U-shaped member having its ends secured to the outer ends of the rockable bars for flexibly connecting the same.

In testimony whereof I affix my signature.

HARRY P. WRIGHT.